(12) United States Patent
Morris et al.

(10) Patent No.: US 10,598,366 B1
(45) Date of Patent: Mar. 24, 2020

(54) HYDROPONIC TOWER COMPATIBLE LIGHT SYSTEM

(71) Applicant: MJNN, LLC, South San Francisco, CA (US)

(72) Inventors: Kevin Kai Morris, Oakland, CA (US); Grant Thomas Lindblom, South San Francisco, CA (US); Frances Willcox Esparza, San Francisco, CA (US); Paul Guerra, Redwood City, CA (US); Meaghan Fitzgerald, South San Francisco, CA (US); Juli Satoh, Clovis, CA (US); Michael Peter Flynn, Palo Alto, CA (US)

(73) Assignee: MJNN, LLC, South San Francisco, CA (US)

( * ) Notice: Subject to any disclaimer, the term of this patent is extended or adjusted under 35 U.S.C. 154(b) by 0 days.

(21) Appl. No.: 16/397,818

(22) Filed: Apr. 29, 2019

(51) Int. Cl.
| | |
|---|---|
| *F21V 29/56* | (2015.01) |
| *A01G 31/06* | (2006.01) |
| *F21V 31/00* | (2006.01) |
| *A01G 7/04* | (2006.01) |
| *F21V 23/00* | (2015.01) |
| *F21Y 115/10* | (2016.01) |

(52) U.S. Cl.
CPC ............. *F21V 29/56* (2015.01); *A01G 7/045* (2013.01); *A01G 31/06* (2013.01); *F21V 23/005* (2013.01); *F21V 31/005* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 6,880,952 B2 | 4/2005 | Kiraly | |
| 2009/0190350 A1 | 7/2009 | Tseng | |
| 2011/0075416 A1 | 3/2011 | Chou et al. | |
| 2011/0304270 A1 | 12/2011 | Scarpelli | |
| 2014/0000162 A1 | 1/2014 | Blank | |
| 2014/0020292 A1 | 1/2014 | McNamara et al. | |
| 2014/0185300 A1 | 7/2014 | Martinez et al. | |
| 2014/0225003 A1 | 8/2014 | Koo et al. | |
| 2014/0369061 A1 | 12/2014 | Kim | |
| 2015/0284266 A1 | 10/2015 | Matsui | |
| 2015/0308631 A1 | 10/2015 | Gorman | |
| 2017/0051901 A1 | 2/2017 | Ogata | |

FOREIGN PATENT DOCUMENTS

| | | |
|---|---|---|
| EP | 2090824 | 8/2009 |
| WO | PCT/CN2014/084718 | 1/2014 |

*Primary Examiner* — Elmito Breval
(74) *Attorney, Agent, or Firm* — Patent Law Office of David G. Beck (57) ABSTRACT

A lighting system is provided that is configured for use with one or more hydroponic towers. The primary component of the lighting system is a light tube that includes one or more LED boards affixed to a central, actively cooled, mounting fixture. The LED boards may be affixed to one side or to multiple sides of the mounting fixture. A tethering system locates each light tube within the hydroponic farming facility, the tethering system configured to (i) allow for thermal expansion and contraction of the light tube, (ii) maintain the desired location of the light tube, (iii) simplify removal of the light tube, (iv) prevent accidental disengagement from the top mounting fixture while still allowing limited movement of the light tube, and (v) allow disengagement from the bottom mounting fixture when undue stress is applied to the light tube.

21 Claims, 12 Drawing Sheets

HYDROPONIC TOWER COMPATIBLE LIGHT SYSTEM

FIELD OF THE INVENTION

The present invention relates generally to hydroponic growing systems and, more particularly, to a lighting system configured to provide light to one or more vertical hydroponic towers.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a hydroponic compatible lighting system.

SUMMARY OF THE INVENTION

A liquid cooled lighting system is provided, the liquid cooled lighting system configured for use with a hydroponic tower. The lighting system includes (i) an LED board mounting fixture that includes an internal coolant passageway; (ii) at least one LED board mounted to a first side of the LED board mounting fixture; (iii) a first coolant coupler rigidly attached to an upper end of the LED board mounting fixture, where a first portion of the first coolant coupler fits within the internal coolant passageway and fluidly connects the first coolant coupler to the internal coolant passageway; (iv) an upper end cap assembly rigidly attached to the upper end of the LED board mounting fixture, where a second portion of the first coolant coupler passes through the upper end cap assembly, and where a third portion of the first coolant coupler extends beyond the upper end cap assembly and is configured for attachment to a first coolant conduit; (v) a second coolant coupler rigidly attached to a lower end of the LED board mounting fixture, where a first portion of the second coolant coupler fits within the internal coolant passageway and fluidly connects the second coolant coupler to the internal coolant passageway; (vi) a lower end cap assembly, where the lower end cap assembly is not rigidly attached to the LED board mounting fixture, where a second portion of the second coolant coupler passes through the lower end cap assembly, where the lower end cap assembly is free to move about the second portion of the second coolant coupler along an axis of the second coolant coupler, and where a third portion of the second coolant coupler extends beyond the lower end cap assembly and is configured for attachment to a second coolant conduit; and (vii) a light tube shield encircling the LED board mounting fixture and extending from the upper end of the LED board mounting fixture to the lower end of the LED board mounting fixture, where a first end of the light tube shield is bonded to the upper end cap assembly and a second end of the light tube shield is bonded to the lower end cap assembly. Preferably a first water-tight seal is created when the first end of the light tube shield is bonded to the upper end cap assembly a second water-tight seal is created when the second end of the light tube shield is bonded to the lower end cap assembly. The light tube shield may include internal features that align and locate the shield relative to the LED board mounting fixture. At least a second LED board may be mounted to a second side of the LED board mounting fixture.

In one aspect of the invention, the lighting system may include a tethering system coupled to the lower end cap assembly. The tethering system includes a guide post, where a first portion of the guide post passes unrestricted through a guide hole in the lower end cap assembly and a second portion of the guide post is configured to fit within a guide fixture. The guide fixture is configured to release the guide post when a force of sufficient intensity is applied to the guide post via the lower end cap assembly. The guide fixture may include a socket configured to surround the second end portion of the guide post, the plurality of teeth configured to hold the guide post in place during routine use of the liquid cooled lighting system and configured to release the guide post when the lateral force is applied to the guide post via the lower end cap assembly.

In another aspect, the lighting system may include a hanging system coupled to the upper end cap assembly. The hanging system includes a hook member, where a base portion of the hook member is configured to accept the upper end cap assembly and where the upper end cap assembly slides into the base portion. A mounting fixture is configured to retain the hook portion of the hook member within a slot, where a first portion of the slot is shaped to allow the hook portion of the hook member to pass unheeded through the slot, and where a second portion of the slot is shaped to capture the hook portion and prevent it from passing unheeded through the slot.

In another aspect, the lighting system may include a pressure equalization membrane in communication with the air space contained within the light tube shield, the pressure equalization membrane permitting two-way passage of vapor into and out of the air space while preventing passage of water into and out of the air space. The pressure equalization membrane may be mounted within the lower end cap assembly.

In another aspect, the lighting system may include a first O-ring to seal the first portion of the first coolant coupler within the internal coolant passageway of the mounting fixture and a second O-ring to seal the first portion of the second coolant coupler within the internal coolant passageway of the mounting fixture. An O-ring may be used to seal the second portion of the second coolant coupler within the central bore of the lower end cap assembly.

In another aspect, both the first coolant coupler and the upper end cap assembly may be rigidly attached to the upper end of the LED board mounting fixture utilizing a single set of mounting features located within the LED board mounting fixture.

In another aspect, the upper end cap assembly may be comprised of a primary member and a secondary member, where the primary member is rigidly attached to the upper end of the LED board mounting fixture, and where an O-ring seals the second portion of the first coolant coupler within the central bore of the secondary member. A set of HV wires from the LED board may pass into the upper end cap assembly via at least a first through-hole in the primary member, and pass out of the upper end cap assembly via at least a second through-hole in the primary member.

In another aspect, first and second LED boards may be mounted to the first side of the LED board mounting fixture, where the first and second LED boards are separated by a gap, and where the first LED board is electrically connected to the second LED board using oversized and flexible electrical connectors.

In another aspect, a plurality of retaining clips may be used to attach the at least one LED board to the LED board mounting fixture, where the retaining clips maintain tension on the LED board, and where first and second end portions of each retaining clip extend around first and second edges, respectively, of the LED board mounting fixture. Electrically insulating spacers may be located between the retaining clips and the LED board. Each of the electrically insulating spacers may include an indent feature configured to locate the corresponding retaining clip. Each of the electrically insulating spacers may include a tab sized to fit within a corresponding hole in the LED board, the tab configured to locate the insulating spacer relative to the LED board.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. The same reference label on different figures should be understood to refer to the same component or a component of similar functionality. Additionally, multiple labels using the same numerical label and differing only in the letter label (e.g., 401A and 401B) refer to components of the same or similar functionality but positioned in different locations within or on the apparatus.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

The present invention provides a lighting system that is configured for use with one or more vertical hydroponic towers. The primary component of the lighting system is a light tube, the light tube including one or more LED boards affixed to a central, thermally conductive, mounting fixture. The mounting fixture is configured to provide for active cooling using a liquid coolant pumped through the mounting fixture's core. The LED boards may be affixed to only one side of the mounting fixture or to multiple sides of the mounting fixture, where the number and location of the LED boards on the mounting fixture is primarily dependent upon the layout of the hydroponic towers within the hydroponic farming facility as well as the desired light spectrum. Typically LED boards are mounted to two sides of the mounting fixture when the lighting system is intended to be positioned between adjacent hydroponic towers and to one side of the mounting fixture when the lighting system is intended to be positioned proximate to a single hydroponic tower. A tethering system is used to locate each light tube within the hydroponic farming facility, the tethering system configured to (i) allow for thermal expansion and contraction of the light tube, (ii) maintain the desired location of the light tube, (iii) simplify removal of the light tube, (iv) prevent accidental disengagement from the top mounting fixture while still allowing limited movement of the light tube, and (v) allow disengagement from the bottom mounting fixture when undue stress is applied to the light tube (e.g., by a worker accidentally bumping into the light tube).

Figure 1:
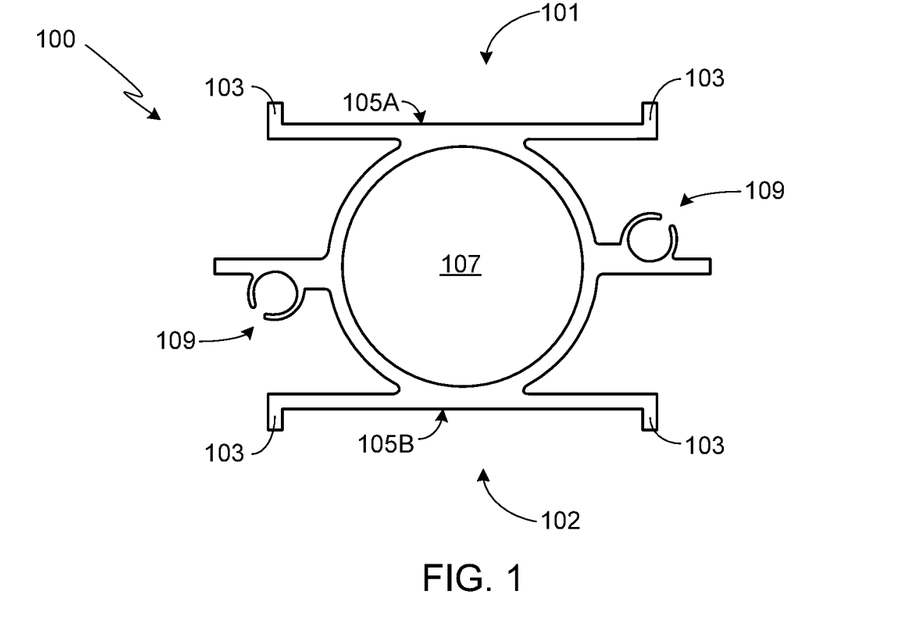
FIG. 1 provides a cross-sectional view of a mounting fixture configured for use with the preferred embodiment of the lighting system of the invention.

FIG. 1 provides a cross-sectional view of a preferred configuration for the LED board mounting fixture 100. Fixture 100 is fabricated from a material with a relatively high thermal conductivity and, in the preferred embodiment, is fabricated from aluminum. Preferably mounting fixture 100 is manufactured using an extrusion process and as such, it should be understood that the features shown in FIG. 1 extend along the entire length of the fixture. Upper portion 101 and lower portion 102 each include a pair of edge features 103 (e.g., lips), with the edge features 103 being located on either side of an LED board mounting surface (i.e., surfaces 105A and 105B). The width between edge features 103 is sized to accommodate the intended LED board (see FIG. 2). To minimize costs, in the preferred embodiment of the invention the mounting fixture is configured to be used with either a single-sided or a dual-sided lighting configuration. This approach is preferred over that of fabricating mounting fixtures that are configured solely for single-sided lights and mounting fixtures configured for dual-sided lights. Accordingly, mounting fixture 100 may be used with a single-sided configuration by mounting one or more LED boards on only one of the mounting surfaces, i.e., either mounting surface 105A or mounting surface 105B, and used with a dual-sided configuration by mounting one or more LED boards on both mounting surfaces 105A and 105B.

In addition to providing mounting surfaces for the LED boards comprising the light tube, mounting fixture 100 provides a means of removing heat generated by the LED boards and transferred to the mounting fixture. Specifically, mounting fixture 100 includes a hollow core 107 through which a suitable, non-gaseous, heat transfer fluid (i.e., coolant) flows. Preferably the heat transfer fluid is water-based, e.g., pure water or water that includes an additive such as ethylene glycol or propylene glycol. The coolant that is pumped through core 107 of the mounting fixture is cooled using a conventional thermal management system such as those well known by those of skill in the art. Exemplary thermal management systems may remove heat from the coolant using conventional coolant-air heat exchangers or by transferring the heat generated within the light cooling system to another cooling system, for example one utilizing refrigerant.

The preferred embodiment of mounting fixture 100 includes a pair of mounting features 109. Mounting features 109 are sized to accommodate screws which, as disclosed in detail below, hold the coolant coupling members (i.e., an inlet coupler and an outlet coupler) in place. The coolant coupling members, not shown in this figure, couple the hollow core 107 of fixture 100 to the thermal management system.

Figure 2:
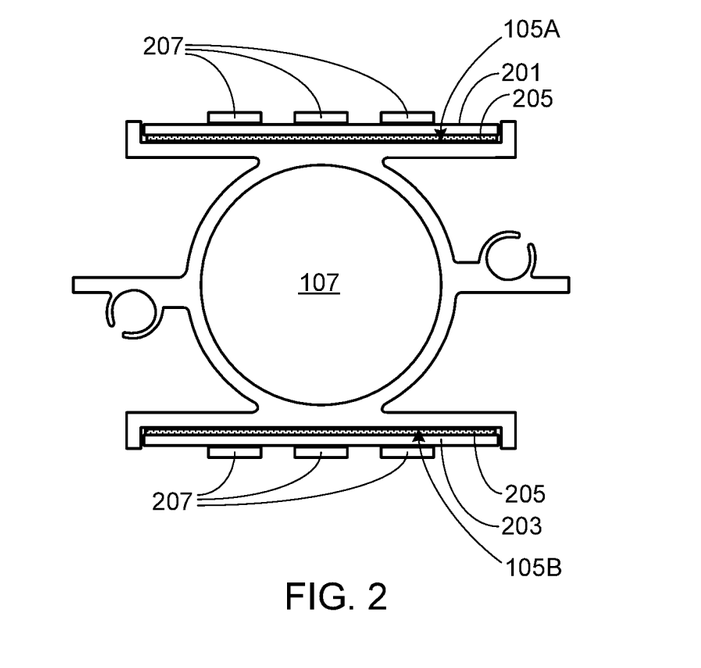
FIG. 2 provides the same cross-sectional view of the mounting fixture shown in FIG. 1 with the addition of LED boards mounted on either side of the fixture.

FIG. 2 provides a similar cross-sectional view of the mounting fixture as that shown in FIG. 1. In FIG. 2, an LED board 201 is shown mounted to mounting surface 105A and an LED board 203 is shown mounted to mounting surface 105B. To improve thermal communication between the back surface of each LED board and mounting fixture 100, a layer 205 of a thermally conductive medium is located between each LED board and the corresponding mounting surface of the fixture. Preferably a double-sided, thermally conductive tape is used for this purpose, thus providing improved thermal communication between the LED boards and the fixture. It should be understood, however, that other materials (e.g., a thermally conductive paste) may be used to provide a preferential heat-transfer path between the LED light boards and fixture 100. Thermally conductive tape is preferred, however, as thermally conductive pastes, gels, and greases are more difficult to constrain to an intended region than tape. Note that in FIG. 2 several LEDs 207 are shown mounted to boards 201 and 203.

Figure 3:
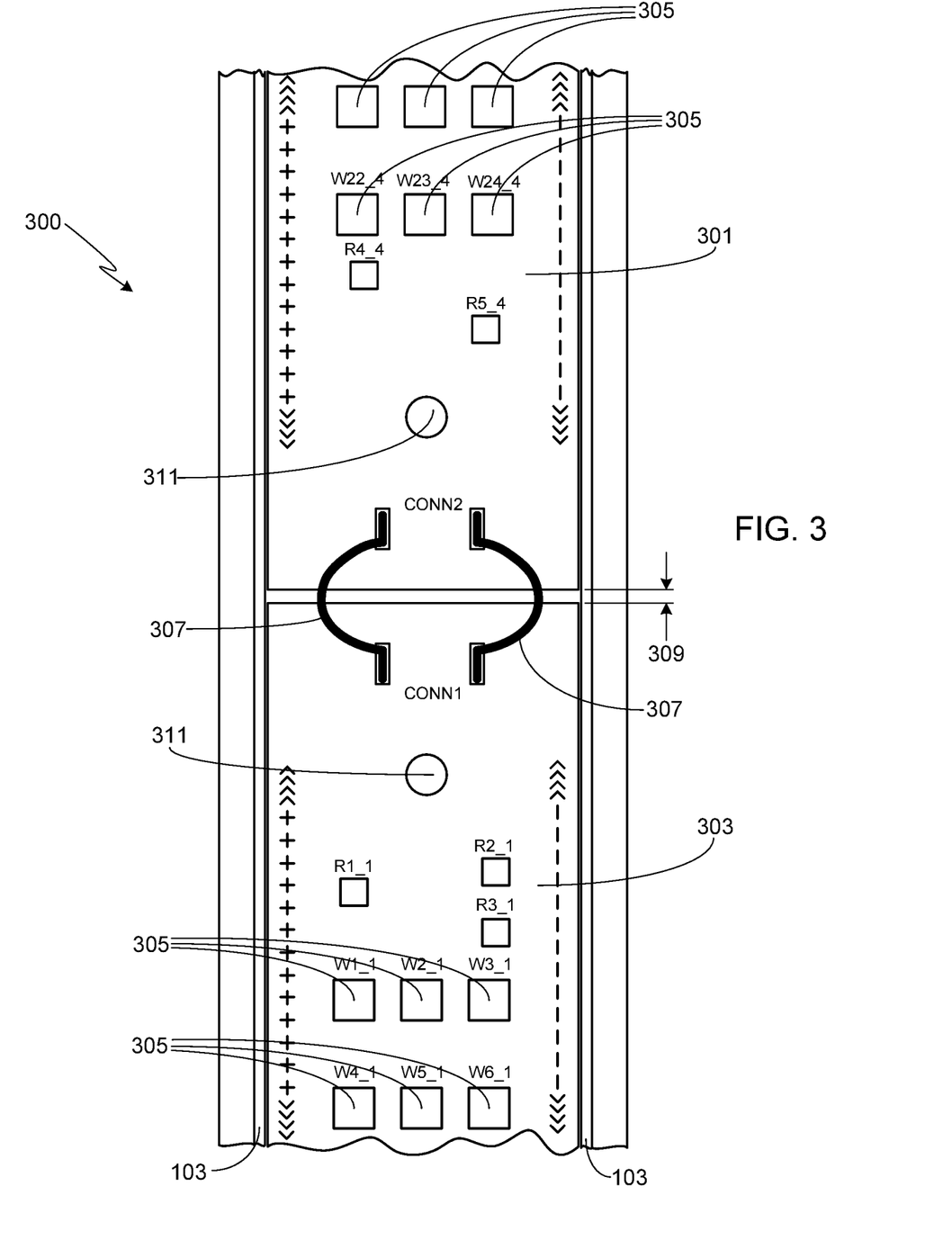
FIG. 3 provides a top view of a portion of a light tube, this view illustrating the flexible electrical connectors used to couple LED boards together.

In the preferred embodiment of the invention, each side of mounting fixture 100 includes multiple LED boards. Similarly, if only one side of fixture 100 is populated with light boards, preferably multiple LED boards are affixed to the desired side of the fixture. FIG. 3 provides a top view of a portion 300 of a light tube. In the illustrated view, a portion of a first LED board 301 and a portion of a second LED board 303 are visible. In addition to LEDs 305, this figure clearly illustrates the connectors 307 that electrically couple the two LED boards together. In order to prevent issues from arising due to light board movement, for example due to the expansion and contraction effects that result from board heating and cooling, connectors 307 are flexible. Additionally, and as shown, connectors 307 are longer (i.e., oversized) than required to simply connect the two boards together, the additional length ensuring that as the boards expand and contract, or as a long light fixture flexes, board movement is not constricted by the connectors 307. Note that in this view a gap 309 between LED boards 301 and 303 is clearly visible, this gap also ensuring that the LED boards are free to expand and contract as necessary.

A plurality of retaining clips are used to hold each of the LED boards in place and ensure that adequate thermal communication is maintained between the boards and the underlying fixture. These clips are designed to allow the boards to move slightly along the length of the light tube as the boards and related hardware expand and contract during the thermal cycling which result from light system operation. While the clips are designed to allow movement along the length of the fixture and easily accommodate board expansion, they are locked in place relative to each LED board in order to prevent the clips from accidentally damaging a board component (e.g., an LED).

Figure 4:
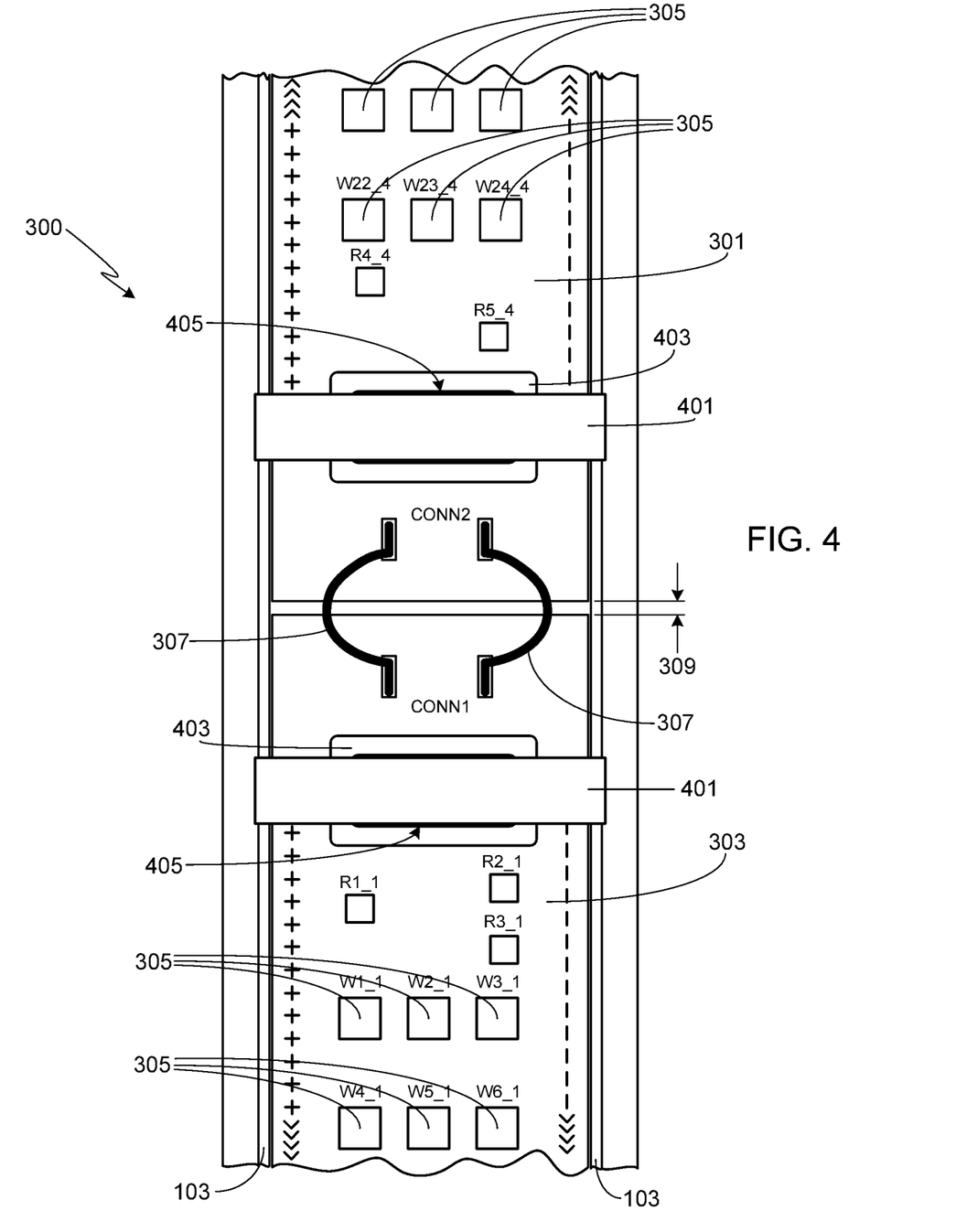
FIG. 4 provides the same view of the portion of the light tube as that shown in FIG. 3, this figure including multiple LED board retaining clips.

FIG. 4 provides the same view of portion 300 of the light tube as that shown in FIG. 3, this figure also showing two of the clips 401 that are used to hold the LED boards in place. It should be understood that each LED board is held against the mounting fixture using multiple clips 401 and FIG. 4 simply shows two such clips, one used with LED board 301 and the second used with LED board 303. In the preferred embodiment, the clips 401 do not directly contact the LED boards. Instead of direct contact, an electrically insulating spacer 403 is located between the clips and the LED boards. In addition to providing electrical insulation, spacers 403 prevent undue abrasion of the underlying LED boards. Locating holes 311 within the LED boards are used to locate and lock each spacer 403 into place. An indent feature 405 on the top surface of each spacer 403 locates and locks each clip 401 into place relative to the corresponding spacer, and thus locates and locks each clip 401 into place relative to the underlying LED board.

Figure 5:
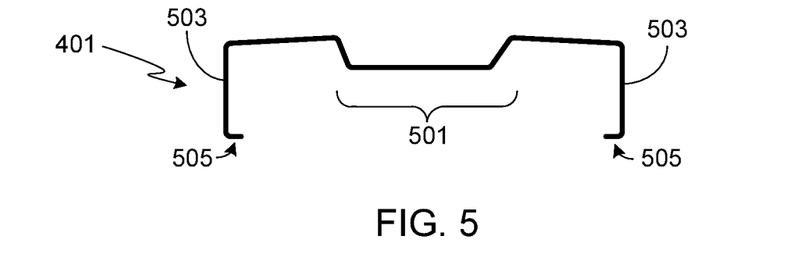
FIG. 5 provides a side view of an LED board retaining clip.

FIG. 5 provides a side view of retaining clip 401. Retaining clip 401 is preferably fabricated from spring steel, or a similar material, that maintains tension on insulating spacer 403 and the underlying LED board. As shown, portion 501 of clip 401 is shaped and sized to fit within indent 405 of spacer 403. The sides 503 and clip ends 505 of each clip 401 are sized to extend around the edges of the LED board mounting surface, thereby clipping onto the mounting fixture and holding the LED board in place.

Figure 6:
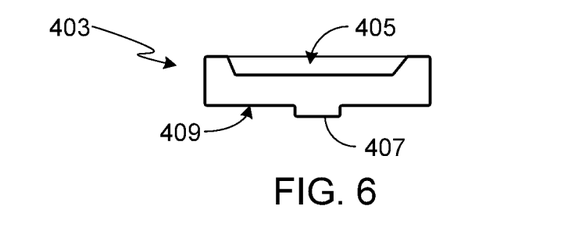
FIG. 6 provides a cross-sectional view of the insulating spacer used with the LED board retaining clip.
Figure 7:
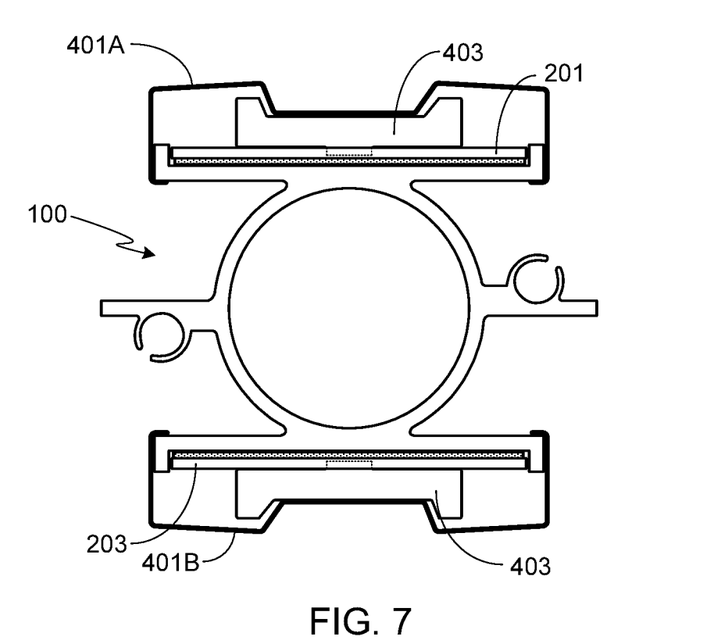
FIG. 7 provides a cross-sectional view of the mounting fixture with LED boards held in place on the top and bottom fixture surfaces utilizing the retaining clips and insulating spacers shown in FIGS. 5 and 6, respectively.

FIG. 6 provides a cross-sectional view of insulating spacer 403. Preferably spacer 403 is fabricated from a plastic such as a polyamide (e.g., nylon). Tab 407, extending from the bottom surface 409 of spacer 403, is shaped and sized to fit within the locating holes 311 formed in each of the LED boards. FIG. 7 provides a cross-sectional view of a portion of a light tube, similar to the view shown in FIG. 2, with a first clip 401A holding board 201 in place and a second clip 401B holding board 203 in place.

Figure 8:
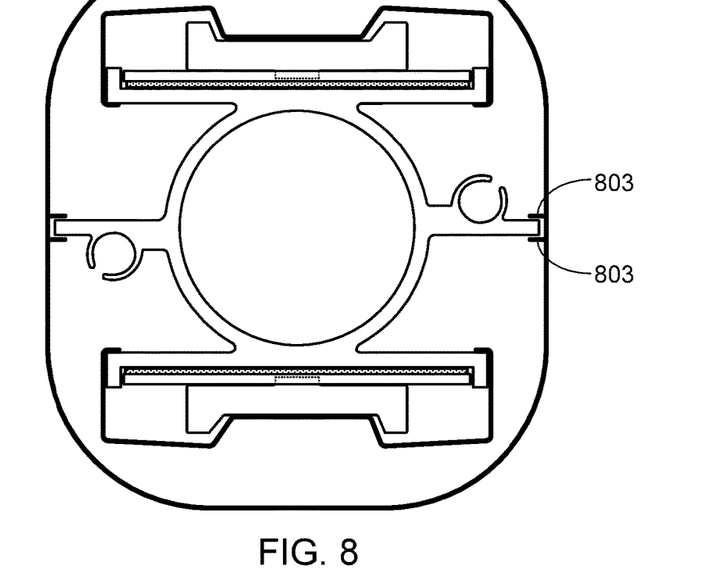
FIG. 8 provides a similar cross-sectional view as that provided in FIG. 7 with the addition of a tubular member that surrounds and encases the light assembly.

Given the environment of a hydroponic farm, the preferred embodiment of the light assembly includes a clear tube that surrounds the light assembly. FIG. 8 provides a similar cross-sectional view as that provided in FIG. 7 with the addition of tube 801 (also referred to herein as a tubular member and a light tube shield). Tube 801 extends the entire length of the light assembly and is sealed, as described in detail below, to both light assembly end caps. Preferably tube 801 includes internal features 803 that are used to align the tube relative to mounting fixture 100, and thus the LED boards. Tube 801, which is preferably fabricated as a single piece from a plastic material (e.g., acrylic, polycarbonate, etc.), performs several important functions. First, it prevents moisture, dirt or other contaminants (e.g., plant nutrient solution) from contacting, contaminating and/or potentially damaging the electronic components within the light assembly. Second, it simplifies light tube handling. Third, it prevents someone from being harmed by accidentally touching a high voltage light component.

In the preferred embodiment, tube member 801 is clear and is used solely for protection as noted above. The inventors, however, envision that member 801 can be treated to provide secondary benefits such as light control (e.g., focusing or diffusing the light emitted by the LEDs) and/or wavelength control (e.g., filtering the light emitted by the LEDs to provide a selective light spectrum). In the preferred embodiment, light and wavelength control is provided through selection of specific LEDs that emit the desired light spectrum and light spread (e.g., via LED lenses).

Figure 9:
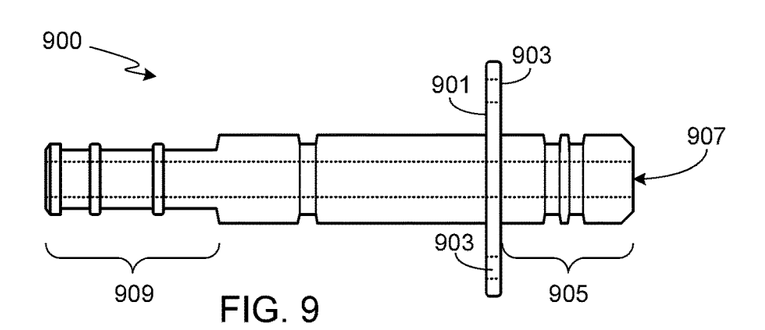
FIG. 9 provides a side view of the coolant coupler configured for use with the light tube.
Figure 10:
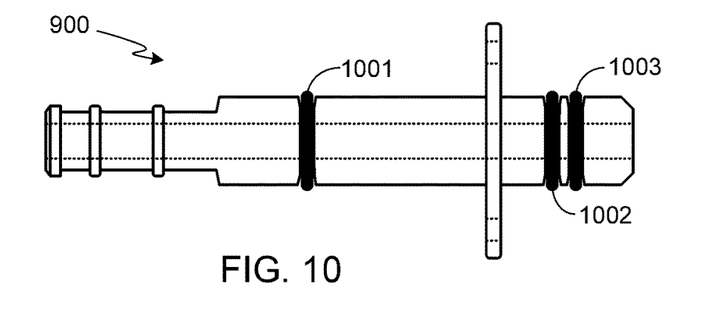
FIG. 10 provides the same view of the coolant coupler provided in FIG. 9 with the inclusion of O-rings.
Figure 11:
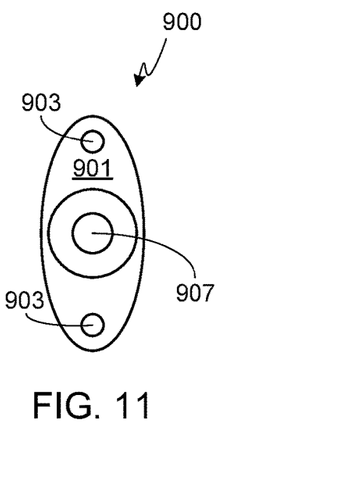
FIG. 11 provides an end view of the coolant coupler shown in FIGS. 9 and 10.

FIGS. 9 and 10 provide side views without and with O-rings 1001-1003, respectively, of the preferred coolant coupler 900. FIG. 11 provides an end view of coolant coupler 900. To simplify light assembly fabrication and minimize the number of parts required per light assembly, the same coolant coupler 900 is used at both ends of the light tube. Coolant coupler 900 includes a mounting flange 901 that is sized such that the coupler mounting holes 903 align with mounting features 109 of fixture 100, thus allowing the coolant coupler to be mounted to fixture 100 with screws.

End portion 905 of coolant coupler 900 is intended to fit within the hollow coolant passageway 107 of mounting fixture 100, thus allowing coolant to flow through bore 907 of the coupler and into/out of fixture 100 via fixture bore 107. O-rings 1002 and 1003 seal coupler 900 to bore 107 of mounting fixture 100. End portion 909 of the coolant coupler is configured to be attached to the intended thermal management system, preferably utilizing flexible coolant conduits (not shown) in order to allow limited movement of the light tube relative to its mount.

Figure 12:
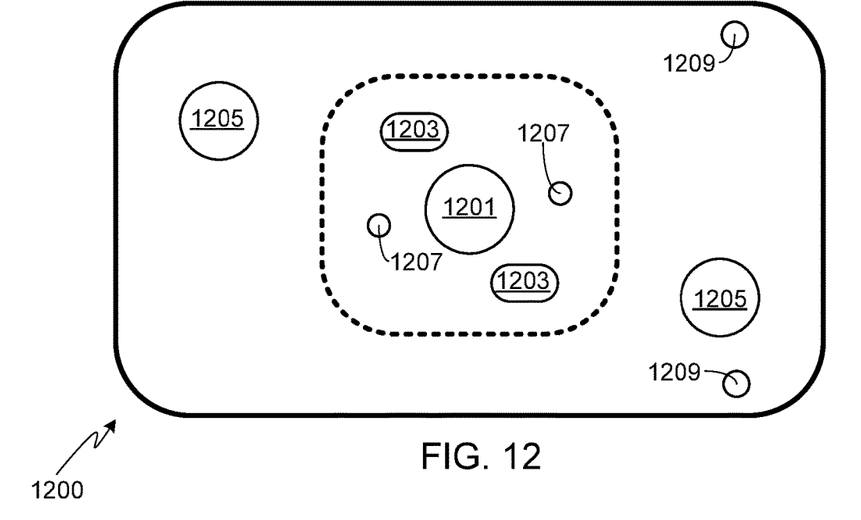
FIG. 12 provides a top view of the primary member of the light tube upper end cap assembly.
Figure 13:
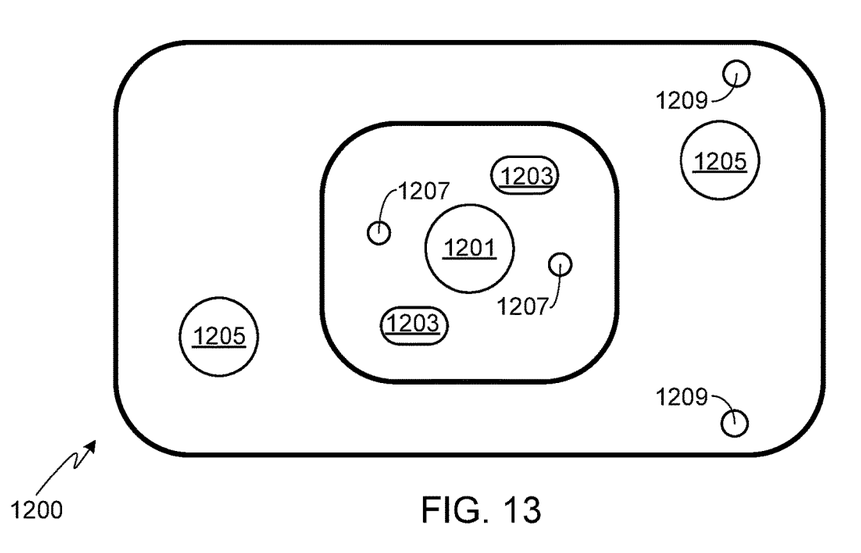
FIG. 13 provides a bottom view of the primary member of the light tube upper end cap assembly shown in FIG. 12.
Figure 14:
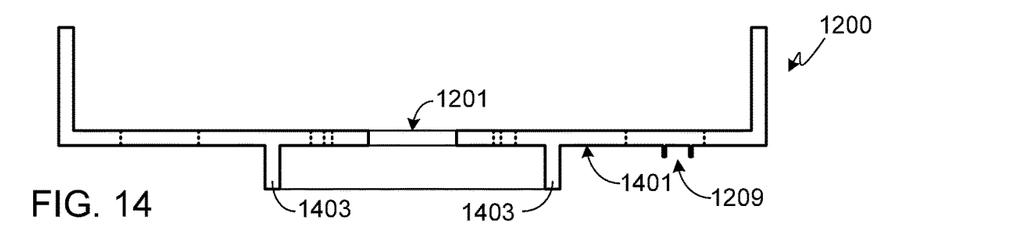
FIG. 14 provides a cross-sectional view of the primary member of the light tube upper end cap assembly shown in FIGS. 12 and 13.
Figure 15:
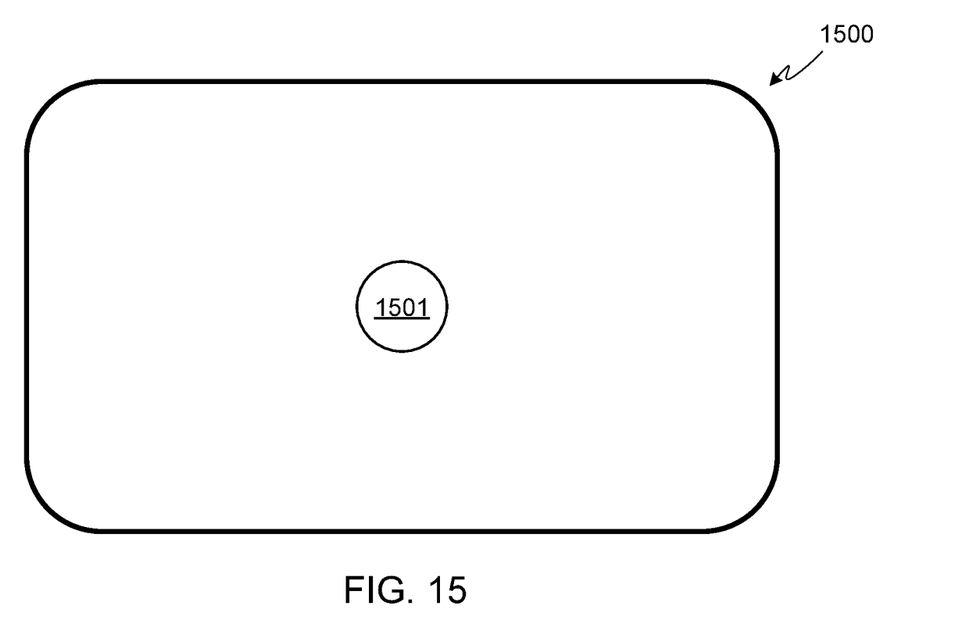
FIG. 15 provides a top view of the secondary member of the light tube upper end cap assembly.
Figure 16:
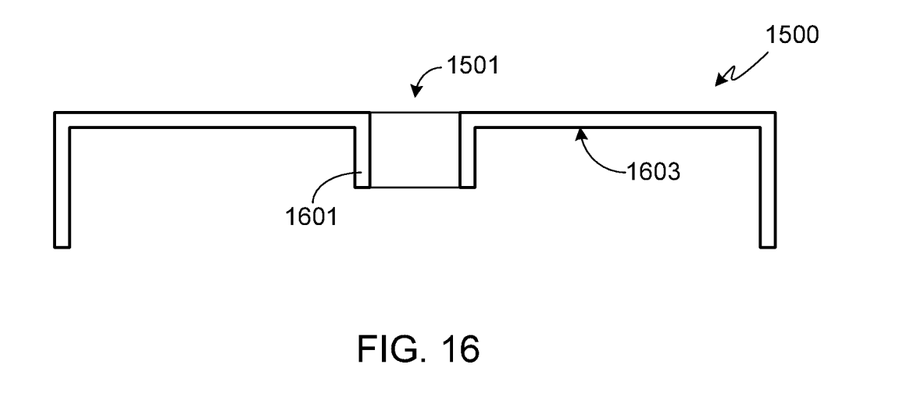
FIG. 16 provides a cross-sectional view of the secondary member of the light tube upper end cap assembly shown in FIG. 15.
Figure 17:
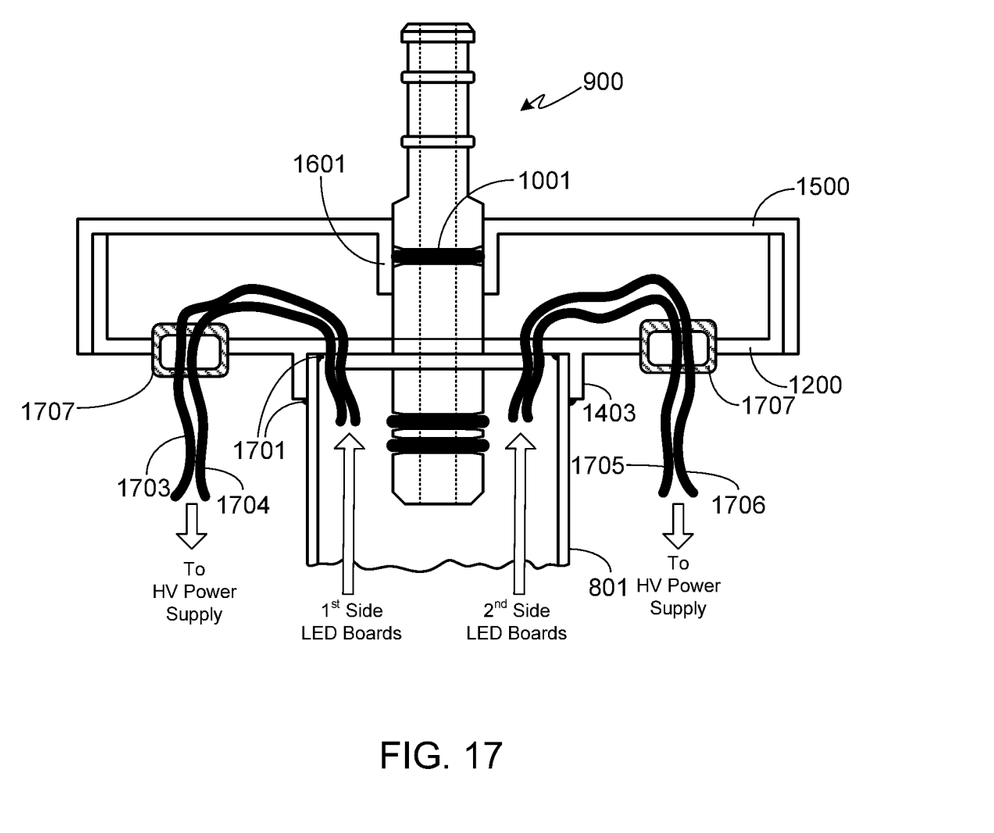
FIG. 17 provides a simplified cross-sectional view of the light tube upper end cap assembly along with the coolant coupler and a portion of the light tube shield.

The upper end cap assembly of the preferred embodiment utilizes a two piece design. FIGS. 12-14 provide top, bottom and cross-sectional views of the primary member 1200 of the upper end cap assembly while FIGS. 15 and 16 provide top and cross-sectional views of the secondary member 1500 of the upper end cap assembly. FIG. 17 provides a simplified cross-sectional view of the assembled upper end cap assembly along with coolant coupler 900 and a portion of light tube shield 801.

Primary member 1200 includes a central bore 1201 sized to permit coolant coupler 900 to pass through as shown in FIG. 17. The bottom surface 1401 of primary member 1200 includes a lip 1403 that extends out and away from surface 1401 and is sized to accommodate a first end of light tube shield 801. Light shield tube 801 is bonded to primary member 1200, the adhesive bond 1701 creating a water-tight seal between shield 801 and the upper end cap assembly, specifically primary member 1200 of the upper end cap assembly.

Primary member 1200 also includes a pair of through-holes 1203 through which the HV wires 1703-1706 that are coupled to the LED boards pass. A second pair of through-holes 1205 is configured to allow HV wires 1703-1706 to exit the upper end cap assembly so that they may be coupled to the LED HV power supply. Preferably cable strain relief couplers 1707 are fit into through-holes 1205 and used to ensure that undue stress is not applied to the HV wires that could potentially damage the LED boards or the LED board connectors.

Primary member 1200 also includes a pair of through-holes 1207 that are aligned with mounting features 109 of fixture 100. Through-holes 1207 allow the same screws to be used to mount both coolant coupler 900 and primary member 1200 to fixture 100. Additionally, primary member 1200 includes a pair of mounting features 1209. Mounting features 1209 are sized to accommodate screws which, as disclosed in detail below, hold the light tube, via the upper end cap assembly, to a light hanger.

Secondary member 1500 includes a central bore 1501 sized to permit coolant coupler 900 to pass through as shown in FIG. 17. Central bore 1501 includes a lip 1601. Preferably lip 1601 extends out and away from internal surface 1603 as shown. The cylindrical design of lip 1601 is configured such that O-ring 1001 forms a seal within it. As a result of this design, if there is a fluid leak above the light tube, the fluid cannot enter into the upper cap assembly, thereby reducing the risk of the HV components coming into contact with water or other fluid.

Figure 18:
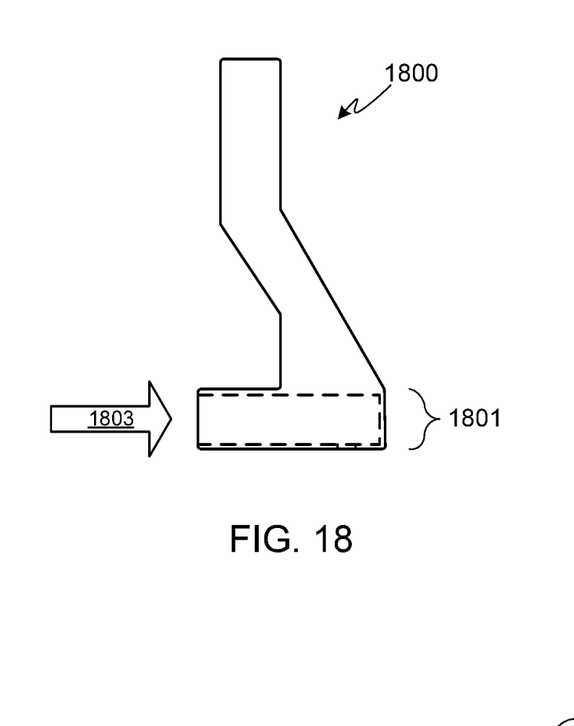
FIG. 18 provides a front view of a hook member configured to tether the light pipe to an upper fixture.
Figure 19:
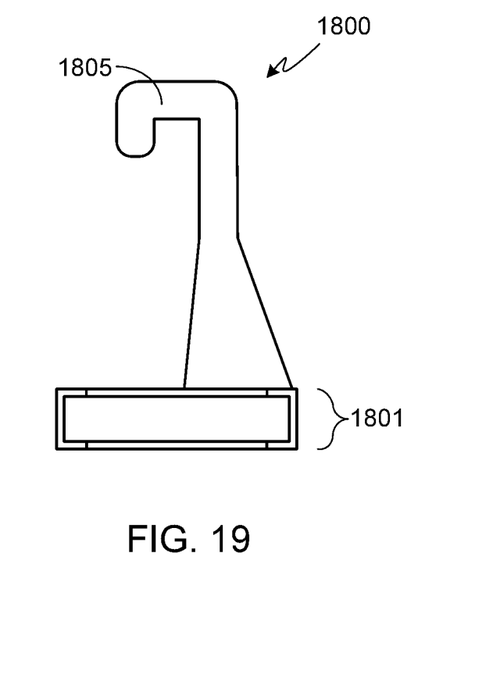
FIG. 19 provides a side view of the hook member shown in FIG. 18.
Figure 20:
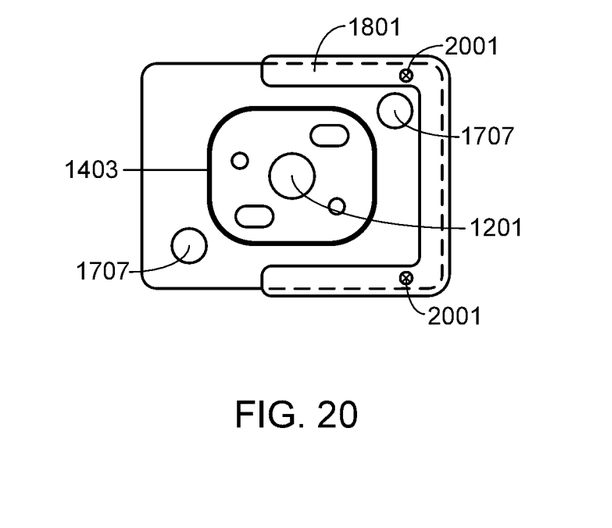
FIG. 20 provides a simplified bottom view of the base of the hook member shown in FIGS. 18 and 19 with the upper end cap assembly in place.

In the preferred embodiment of the invention, a hook member is attached to the upper cap assembly, thus allowing the light tube to hang from a mounting fixture. FIGS. 18 and 19 provide side and front views, respectively, of hook member 1800. As shown, hook member 1800 includes a base portion 1801 that is configured to accept the upper end cap assembly. In this embodiment, the upper end cap assembly slides into base portion 1801 in a direction 1803. FIG. 20 provides a bottom view of hook member 1800. Also visible in this figure is the primary member 1200 after it has been placed into position within base portion 1801. Utilizing mounting features 1209, a pair of screws, bolts or similar fasteners 2001 attach base portion 1801 of hook member 1800 to member 1200 of the upper end cap assembly.

Figure 21:
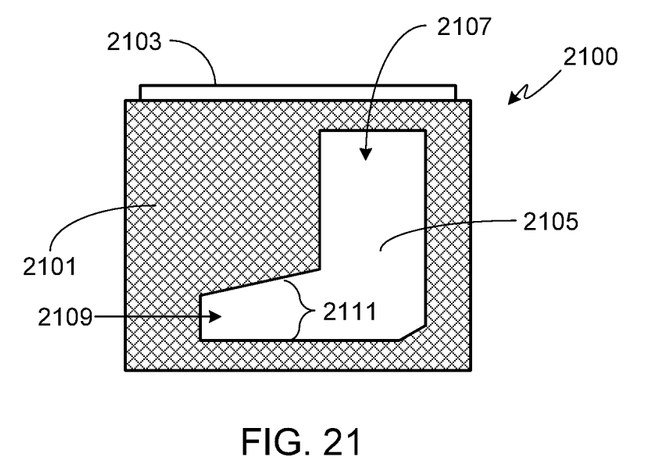
FIG. 21 provides a side view of a mounting fixture configured for use with the hook member shown in FIGS. 18-20.
Figure 22:
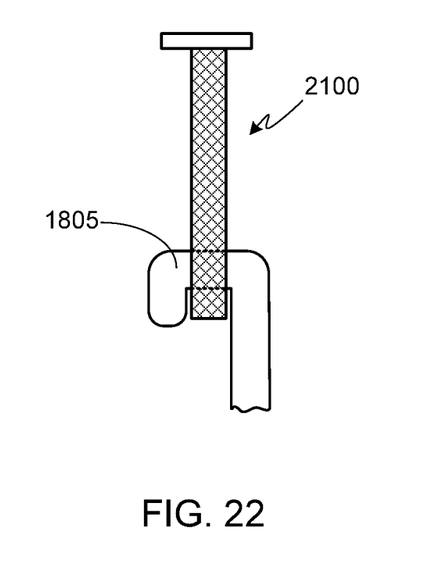
FIG. 22 provides a front view of the mounting fixture shown in FIG. 21 with a portion of the hook member in place.

FIG. 21 provides a side view of a mounting fixture 2100 configured for use with hook member 1800. Mounting fixture 2100 includes a first portion 2101 designed to capture hook portion 1805 of the hook member, and a second portion 2103 used to mount fixture 2100 to the roof or similar member of the farming facility. An open portion 2105 of fixture 2100 allows the hook portion 1805 to pass through the fixture, thus allowing hook portion 1805 and the corresponding light tube to hang from the fixture. Preferably, and as illustrated, open portion 2105 of fixture 2100 is approximately "L" shaped, thus allowing hook portion 1805 to be fed into the large, vertically oriented, slot portion 2107 and then shifted to the side, into the narrow, horizontally oriented, slot portion 2109, thereby effectively locking the hook member and the corresponding light tube into position. The height 2111 of slot portion 2109 is large enough to accommodate hook portion 1805, but sized too small to allow the hook to be accidentally dislodged. As shown, the hook portion may only be removed from the fixture by sliding it to the side into slot portion 2107 and then sliding the entire assembly upwards.

In contrast to the upper end cap assembly, the lower end cap is preferably comprised of a single member. Additionally, in the lower assembly only the coolant coupler 900 is directly attached to mounting fixture 100 via fixture mounting features 109. The lower end cap is not rigidly attached to mounting fixture 100, rather it is rigidly attached to the lower end of light tube shield 801, thus allowing the light shield and the mounting fixture to expand and contract at different rates without creating tensile or compressive stresses on the light assembly components.

Figure 23:
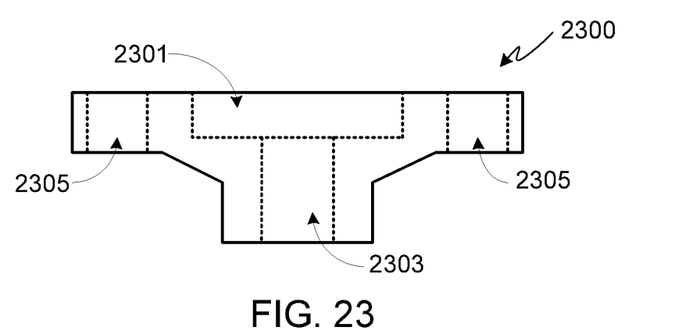
FIG. 23 provides a simplified cross-sectional view of a lower light tube end cap in accordance with the invention.
Figure 24:
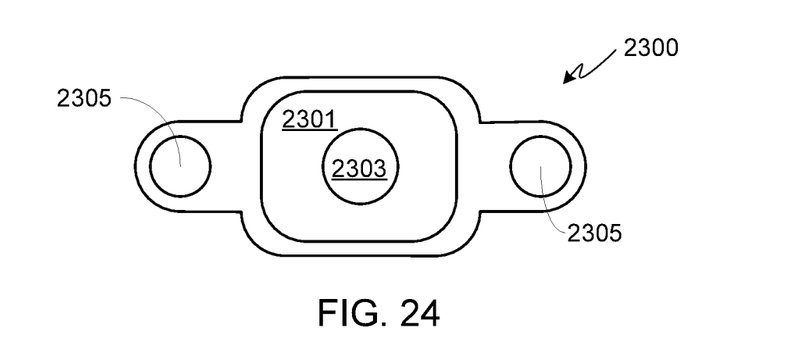
FIG. 24 provides a top view of the lower end cap shown in FIG. 23.
Figure 25:
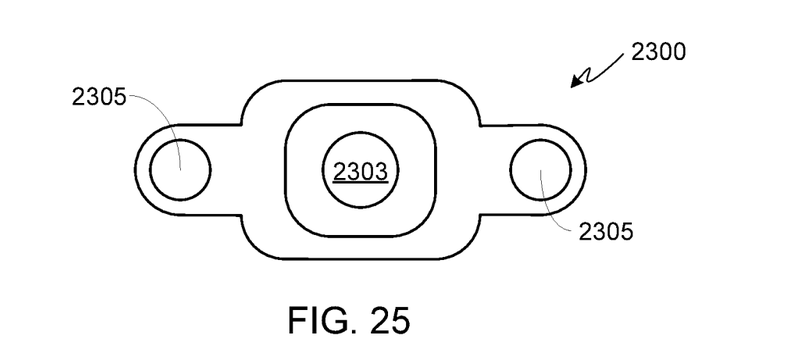
FIG. 25 provides a bottom view of the lower end cap shown in FIGS. 23 and 24.
Figure 26:
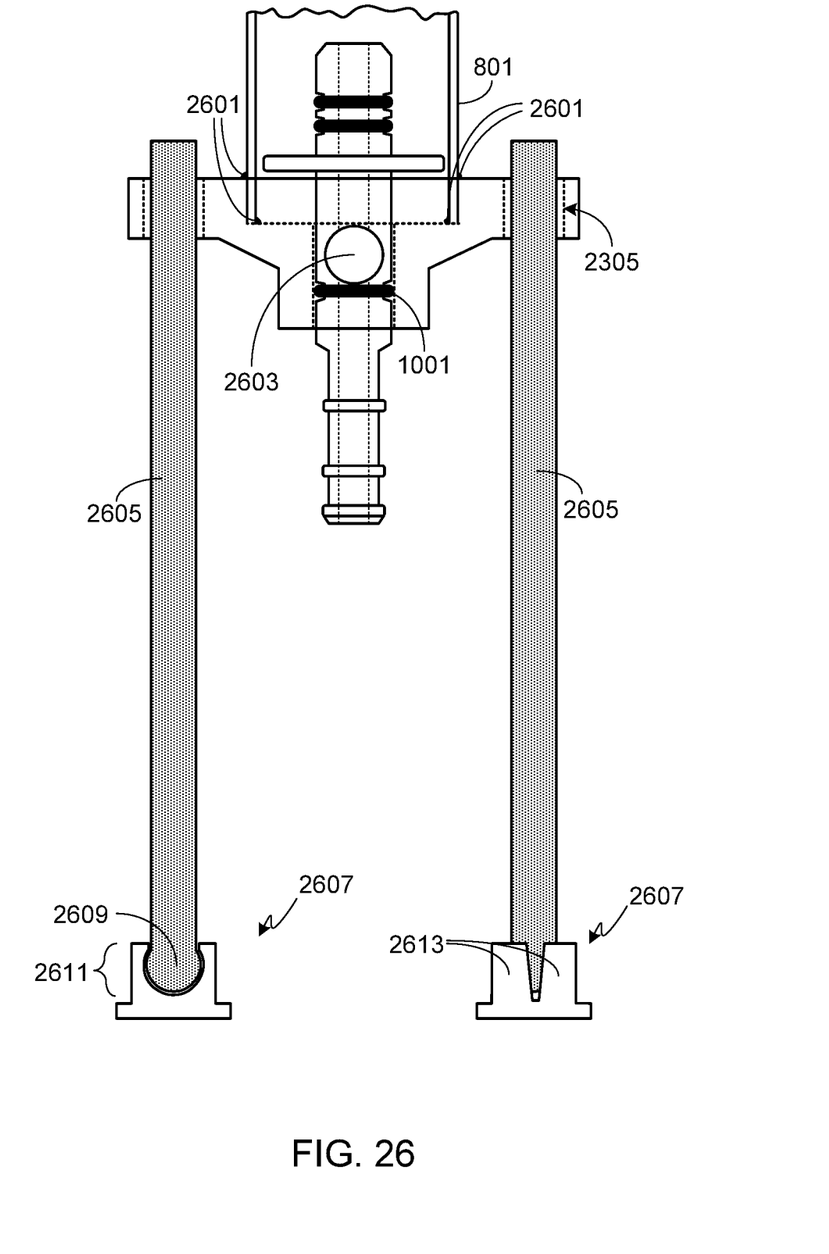
FIG. 26 provides a simplified cross-sectional view of the light tube lower end cap along with the coolant coupler, a portion of the light tube shield, and a light tube tethering system.

FIGS. 23-25 provide a simplified cross-sectional view, a top view and a bottom view of lower end cap 2300. FIG. 26 provides a simplified cross-sectional view of the lower end cap along with coolant coupler 900 and a portion of light tube shield 801. Also shown in FIG. 26 is a tethering system used to maintain the light tube in position. As described below, while the tethering system is designed to hold the light tube in place, it includes a release mechanism that permits light tube movement if the light assembly is accidentally bumped.

As noted above, lower end cap 2300 is not directly attached to mounting fixture 100, rather it is directly attached to light tube 801. The top portion of lower end cap 2300 includes a recess 2301 into which the lower end of light shield tube 801 fits. Tube 801 is bonded into recess 2301 of lower cap member 2300, the adhesive bond 2601 creating a water-tight seal between shield 801 and the lower end cap assembly.

A central bore 2303 passes through member 2300, bore 2303 sized to permit coolant coupler 900 to pass through as shown in FIG. 26. O-ring 1001 creates a seal between the coolant coupler and the lower end cap member. Since the coolant coupler is rigidly fixed to the mounting fixture 100 and the lower end cap 2300 is rigidly fixed to the light shield 801, and since the coefficient of thermal expansion of the mounting fixture can be expected to be different from that of the light shield, this arrangement permits the end cap to move relative to the mounting fixture 100 while still maintaining a seal. Preferably lower end cap member 2300 includes at least one pressure equalization membrane 2603, membrane(s) 2603 permitting water vapor or air to pass while preventing liquids from passing through.

Lower end cap 2300 includes a pair of guide holes 2305. Guide holes 2305 are used as part of a light tube tethering system that is designed to maintain light tube location while still permitting light tube movement when it unexpectedly occurs, for example if the light tube is accidentally jostled during routine farm maintenance. During use, a guide post 2605 passes through each guide hole 2305. In the preferred embodiment, only a single guide post is used, i.e., one of the guide holes 2305 is left unused. The guide post, which is preferably fabricated from plastic, fits within a guide fixture 2607. The end 2609 of post 2605 is spherically shaped and fits within a correspondingly-shaped socket of fixture 2607. The receiving portion 2611 of fixture 2607 (i.e., the socket) is preferably non-continuous, and is instead comprised of multiple fingers 2613. By utilizing a flexible plastic material for fixture 2607, the socket of the fixture is able to hold the end portion 2609 of the post in place during routine use, but then release the post when excessive force is applied to the light tube (e.g., lateral force), and thus applied to the guide post via lower end cap 2300. Note that for clarity, fixture 2607 of the left post assembly in FIG. 26 is shown in cross-section while a side view of fixture 2607 of the right post assembly is provided.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A liquid cooled lighting system configured for use with a hydroponic tower, the liquid cooled lighting system comprising:
   an LED board mounting fixture, said LED board mounting fixture including an internal coolant passageway;
   at least one LED board mounted to a first side of said LED board mounting fixture;
   a first coolant coupler rigidly attached to an upper end of said LED board mounting fixture, wherein a first portion of said first coolant coupler fits within said internal coolant passageway and fluidly connects said first coolant coupler to said internal coolant passageway;
   an upper end cap assembly rigidly attached to said upper end of said LED board mounting fixture, wherein a second portion of said first coolant coupler passes through said upper end cap assembly, and wherein a third portion of said first coolant coupler extends beyond said upper end cap assembly, said third portion of said first coolant coupler configured for attachment to a first coolant conduit;
   a second coolant coupler rigidly attached to a lower end of said LED board mounting fixture, wherein a first portion of said second coolant coupler fits within said internal coolant passageway and fluidly connects said second coolant coupler to said internal coolant passageway;
   a lower end cap assembly, wherein said lower end cap assembly is not rigidly attached to said LED board mounting fixture, wherein a second portion of said second coolant coupler passes through said lower end cap assembly, wherein said lower end cap assembly is free to move about said second portion of said second coolant coupler along an axis of said second coolant coupler, and wherein a third portion of said second coolant coupler extends beyond said lower end cap assembly, said third portion of said second coolant coupler configured for attachment to a second coolant conduit; and
   a light tube shield encircling said LED board mounting fixture and extending from said upper end of said LED board mounting fixture to said lower end of said LED board mounting fixture, wherein a first end of said light tube shield is bonded to said upper end cap assembly, and wherein a second end of said light tube shield is bonded to said lower end cap assembly.

2. The liquid cooled lighting system of claim 1, further comprising a tethering system coupled to said lower end cap assembly, wherein said lower end cap assembly further comprises a guide hole, said tethering system comprising:
   a guide post, wherein a first end portion of said guide post passes unrestricted through said guide hole; and
   a guide fixture, wherein a second end portion of said guide post is configured to fit within said guide fixture, wherein said guide fixture is configured to release said guide post when a force of sufficient intensity is applied to said guide post via said lower end cap assembly.

3. The liquid cooled lighting system of claim 2, said guide fixture further comprising a socket configured to surround said second end portion of said guide post, said socket configured to hold said guide post in place during routine use of said liquid cooled lighting system and configured to release said guide post when said force is applied to said guide post via said lower end cap assembly.

4. The liquid cooled lighting system of claim 1, further comprising a hanging system coupled to said upper end cap assembly, said hanging system comprising:
   a hook member, wherein a base portion of said hook member is configured to accept said upper end cap assembly, wherein said upper end cap assembly slides into said base portion; and
   a mounting fixture configured to retain a hook portion of said hook member.

5. The liquid cooled lighting system of claim 4, said mounting fixture further comprising a slot, wherein a first portion of said slot is shaped to allow said hook portion of said hook member to pass unheeded through said slot, and wherein a second portion of said slot is shaped to capture said hook portion and prevent said hook portion of said hook member from passing unheeded through said slot.

6. The liquid cooled lighting system of claim 1, further comprising a pressure equalization membrane in communication with an air space contained within said light tube shield, said pressure equalization membrane permitting two-way passage of vapor into and out of said air space, said pressure equalization membrane preventing passage of water into and out of said air space.

7. The liquid cooled lighting system of claim 6, wherein said pressure equalization membrane is mounted within said lower end cap assembly.

8. The liquid cooled lighting system of claim 1, wherein a first water-tight seal is created when said first end of said light tube shield is bonded to said upper end cap assembly, and wherein a second water-tight seal is created when said second end of said light tube shield is bonded to said lower end cap assembly.

9. The liquid cooled lighting system of claim 1, wherein a first O-ring seals said first portion of said first coolant coupler within said internal coolant passageway and wherein a second O-ring seals said first portion of said second coolant coupler within said internal coolant passageway.

10. The liquid cooled lighting system of claim 1, wherein an O-ring seals said second portion of said second coolant coupler within a central bore of said lower end cap assembly.

11. The liquid cooled lighting system of claim 1, said first coolant coupler and said upper end cap assembly rigidly attached to said upper end of said LED board mounting fixture utilizing a single set of mounting features located within said LED board mounting fixture.

12. The liquid cooled lighting system of claim 1, said upper end cap assembly comprising a primary member and a secondary member, said primary member rigidly attached to said upper end of said LED board mounting fixture, wherein an O-ring seals said second portion of said first coolant coupler within a central bore of said secondary member.

13. The liquid cooled lighting system of claim 12, wherein a set of HV wires from said LED board pass into said upper end cap assembly via at least a first through-hole in said primary member, and wherein said set of HV wires pass out of said upper end cap assembly via at least a second through-hole in said primary member.

14. The liquid cooled lighting system of claim 1, said at least one LED board further comprising a first LED board mounted to said first side of said LED board mounting fixture and a second LED board mounted to said first side of said LED board mounting fixture, wherein said first LED board is separated from said second LED board by a gap, and wherein said first LED board is electrically connected to said second LED board with oversized and flexible electrical connectors.

15. The liquid cooled lighting system of claim 1, further comprising a plurality of retaining clips, said plurality of retaining clips attaching said at least one LED board to said first side of said LED board mounting fixture, said plurality of retaining clips maintaining tension on said at least one LED board against said first side of said LED board mounting fixture, wherein a first end portion of each of said plurality of retaining clips extends around a first edge of said LED board mounting fixture, and wherein a second end portion of each of said plurality of retaining clips extends around a second edge of said LED board mounting fixture.

16. The liquid cooled lighting system of claim 15, further comprising a plurality of electrically insulating spacers corresponding to said plurality of retaining clips, said plurality of electrically insulating spacers located between said plurality of retaining clips and said at least one LED board.

17. The liquid cooled lighting system of claim 16, wherein each of said plurality of electrically insulating spacers includes an indent feature on an upper spacer surface configured to locate said corresponding retaining clips.

18. The liquid cooled lighting system of claim 16, wherein each of said plurality of electrically insulating spacers includes a tab sized to fit within a corresponding hole in said at least one LED board, said tab configured to locate said insulating spacer relative to said at least one LED board.

19. The liquid cooled lighting system of claim 1, further comprising a layer of a thermally conductive material interposed between said at least one LED board and said first side of said LED board mounting fixture.

20. The liquid cooled lighting system of claim 1, said light tube shield further comprising internal features that align and locate said light tube shield relative to said LED board mounting fixture.

21. The liquid cooled lighting system of claim 1, further comprising a second LED board mounted to a second side of said LED board mounting fixture.

\* \* \* \* \*